United States Patent [19]

Hirsekorn

[11] 4,363,617
[45] Dec. 14, 1982

[54] VACUUM MOLD FOR PLASTICS

[76] Inventor: Franklin D. Hirsekorn, 105 Rosamond, Houston, Tex. 77076

[21] Appl. No.: 284,352

[22] Filed: Jul. 17, 1981

[51] Int. Cl.³ .............................................. B29C 17/04
[52] U.S. Cl. .................................................... 425/388
[58] Field of Search ........ 425/388, 394, 397, DIG. 57

[56] References Cited
U.S. PATENT DOCUMENTS

| | | | |
|---|---|---|---|
| 3,179,980 | 4/1965 | Ryan et al. | 425/388 |
| 3,393,890 | 7/1968 | Lemelson | 425/DIG. 57 |
| 3,540,113 | 11/1970 | Krutzikowsky | 425/388 X |
| 3,811,810 | 5/1974 | Moller | 425/388 X |
| 3,878,010 | 4/1975 | Zammit | 425/388 X |
| 3,953,273 | 4/1976 | Faller | 425/388 X |
| 3,986,809 | 10/1976 | Haog | 425/DIG. 57 |

Primary Examiner—J. Howard Flint, Jr.
Attorney, Agent, or Firm—Neal J. Mosely

[57] ABSTRACT

A vacuum forming mold for plastic sheet truck bed liners is shown which is adjustable for use in forming liners for a variety of sizes and makes of pick-up trucks. The mold is box shaped with a hollow wall construction for drawing a vacuum uniformly around the inner wall thereof. The interior wall of the mold has a width equal to the standard width of a pick-up truck bed of U.S. manufacture or alternatively to the standard width of the truck bed of a foreign-made, imported truck. The length of the mold is at least as long as the longest truck bed length of a U.S. made or a foreign-made truck, respectively. Removable mold parts of predetermined size, corresponding to the size and shape of the truck bed wheel wells are provided for attachment to the walls of the mold at a point corresponding to the location of the wheel wells in a particular make of truck. Removable parts are provided for attachment to the forward end and bottom walls, respectively, corresponding to the configuration required or desired for the bottom and forward walls of the bed liner. Removable parts are provided for the rear wall and the top portion thereof defining the configuration required or desired for the cover or liner for the truck tailgate. A plurality of small holes extend through the inner wall of the mold from the space between the walls of the mold, positioned around each mold part and uniformly spaced on the bottom wall of the mold so that application of vacuum will draw a heated sheet of plastic into the mold and into intimate contact with the feature defining portions thereof.

13 Claims, 8 Drawing Figures

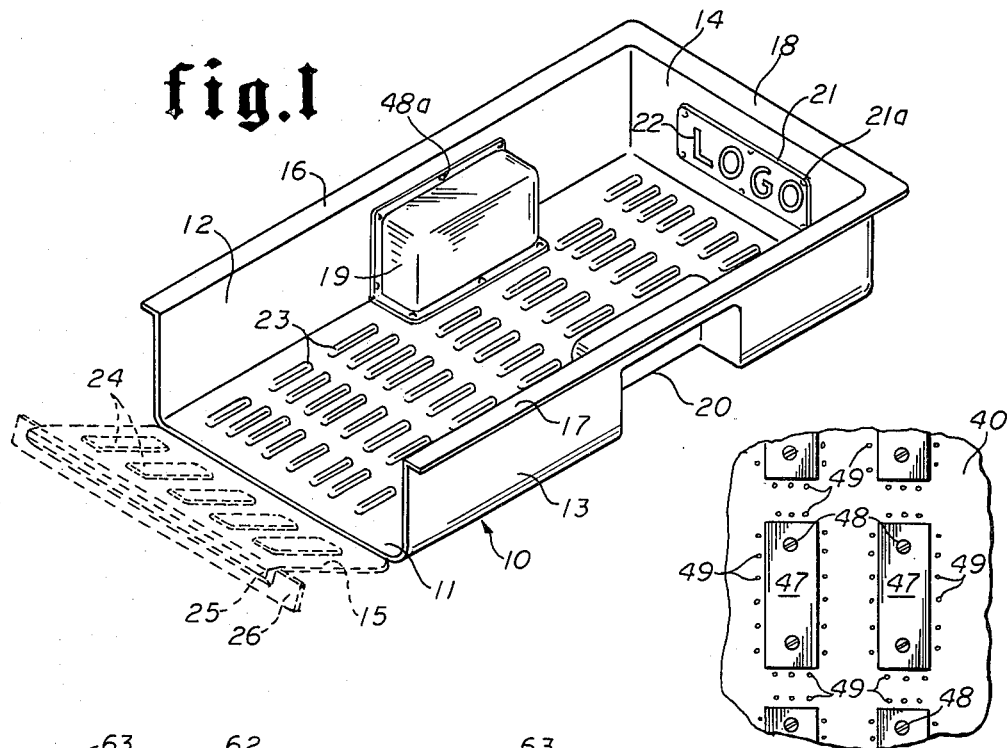
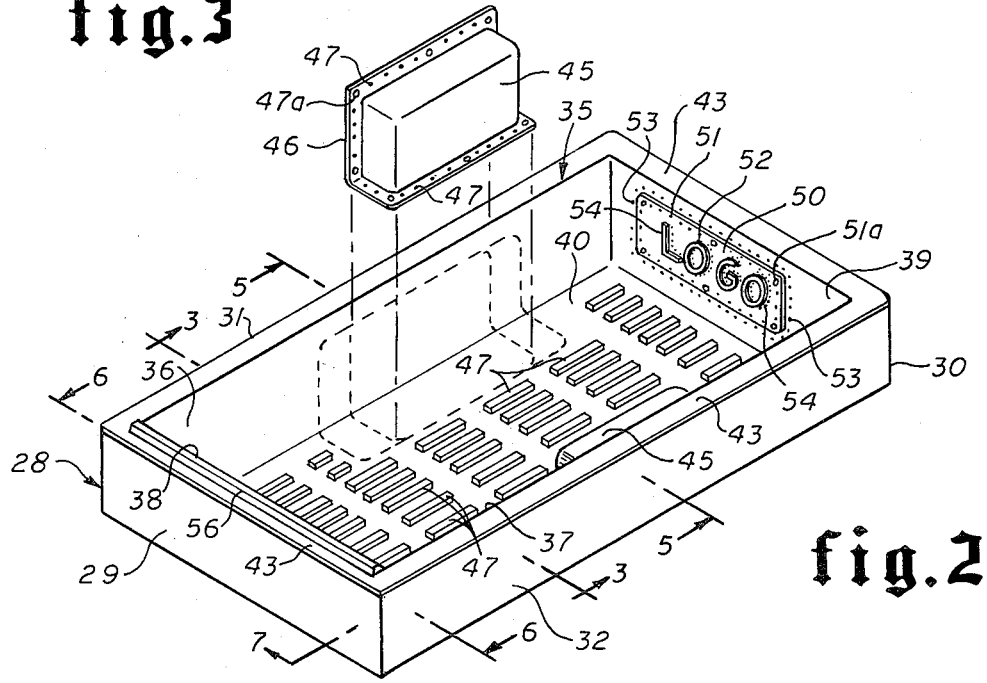

VACUUM MOLD FOR PLASTICS

BACKGROUND OF THE INVENTION

1. Field of the Invention

This invention relates to new and useful improvements in adjustable vacuum forming molds for sheet plastic materials and more particularly to molds for forming sheet plastic into liners for truck beds.

2. Description of the Prior Art

The prior art discloses a number of U.S. patents, such as Lorenzen U.S. Pat. No. 3,814,473, Nix U.S. Pat. No. 3,881,768 and the like in which a solid continuous plastic sheet liner is provided for the beds of pick-up trucks and the like. Such liners have been prepared by vacuum forming of heated plastic sheet material and have been generally formed to fit the interior contours of pick-up trucks or the like.

In the past, vacuum forming molds for forming truck bed liners of the type referred to above have been made to form only a liner of selected size and shape fitting a single make and body style of pick-up truck.

Ercolano U.S. Pat. No. 3,868,288 discloses a double walled, vacuum forming mold for forming appliques of thermoplastic sheet material onto a substrate.

Walter U.S. Pat. No. 4,052,241 discloses a method and apparatus for vacuum forming a flexible material such as a thermoplastic sheet to fit a contoured substrate.

Alter U.S. Pat. No. 4,065,337 discloses a contoured double walled vacuum forming mold for forming sheet plastic into a contoured structure such as a boat hull.

Childress U.S. Pat. No. 3,770,546 discloses an apparatus and method for vacuum forming sheet plastic material, including movable plugs for assisting in the forming of sharp corners.

Smith U.S. Pat. No. 4,053,667 discloses the use of vacuum for laminating sheet plastic material to other objects wherein separate stiffening members are laminated between the plastic sheet covering and the substrate.

Krutzikowsky U.S. Pat. No. 3,540,113 discloses a method and apparatus for vacuum forming a one piece plastic body to be used as the main body portion of a camper truck trailer.

The prior art methods and apparatus used for forming sheet plastic material by vacuum forming and more particularly for the vacuum forming of plastic sheet liners for the beds of pick-up trucks have been of a design which permits the formation of only a single style and size of truck bed liner. As a result, it has been necessary to make a separate and distinct vacuum forming mold for each different make and size of pick-up truck for which a liner is needed. There has been a substantial need for a single multipurpose vacuum forming mold which is capable of forming sheet plastic material into liners for a variety of sizes and makes of pick-up trucks.

SUMMARY OF THE INVENTION

It is therefore one object of this invention to provide a new and improved mold for vacuum forming sheet plastic material into liners for pick-up trucks and the like.

Another object of this invention is to provide a new and improved vacuum forming mold for forming sheet plastic truck bed liners in which a single mold may be used to form liners of various sizes and shapes corresponding to selected different makes, sizes and styles of trucks for which the liners are required.

Another object of this invention is to provide a new and improved vacuum forming mold for forming plastic sheet liners for pick-up trucks and the like having removable and adjustable mold parts for locating and defining selected features of a truck bed liner including the wheel wells and reinforcing ribs in the floor or walls thereof.

Still another object of this invention is to provide a new and improved vacuum forming mold for forming sheet plastic material into liners for pick-up trucks and the like having adjustable, removable mold parts which are affixed to the mold at selected positions and which permit the formation of a variety of sizes of liners variety of makes and models of trucks on which the liners are to be used.

Other objects of this invention will become apparent from time to time throughout the specification and claims as hereinafter related.

The foregoing objects and other objects of this invention are achieved by a vacuum forming mold for forming sheet plastic into bed liners for the beds of pick-up trucks which comprises an open top, rectangular, box-shaped mold having a hollow wall construction with an outer supporting wall and an inner wall spaced therefrom with space therebetween adapted to be subjected to vacuum for vacuum forming sheet plastic. The inner mold wall has a bottom wall, side walls and end walls, the side walls having a side to side width equal to the standard width of the bed of a pick-up truck of United States or foreign manufacture.

The mold has a length between the end walls thereof at least equal to the maximum length of the bed of a pick-up truck of United States or foreign manufacture, respectively. A plurality of removable mold parts are provided which are adapted to be secured on the inner mold wall and have a size and shape corresponding to features of a selected make of pick-up truck. The inner mold wall has a plurality of small holes therein which are uniformly spaced on the bottom wall and spaced around the edges of the removable mold parts. The application of a vacuum to the space between the outer and inner walls is effective to draw a sheet of heated plastic into intimate contact with the inner wall and the surface of the removable mold parts. The outer wall has an opening, preferably in the bottom, for application of a vacuum into the hollow walls of the mold.

BRIEF DESCRIPTION OF THE DRAWINGS

FIG. 1 is a isometric view of a sheet plastic liner for use in pick-up trucks of conventional, commercial design.

FIG. 2 is an isometric view, partially exploded, of a vacuum forming mold for forming a truck bed liner of the type shown in FIG. 1.

FIG. 3 is a sectional view taken on the line 3—3 of FIG. 1 and showing a piece of sheet plastic in place in preparation for vacuum forming to produce the truck bed liner of FIG. 1.

FIG. 4 is a detail view of the bottom of the vacuum forming mold shown in FIG. 2 and illustrating the location of the vacuum forming holes around the rib-forming members in the bottom of the mold.

DESCRIPTION OF THE PREFERRED EMBODIMENTS

Figure 5:
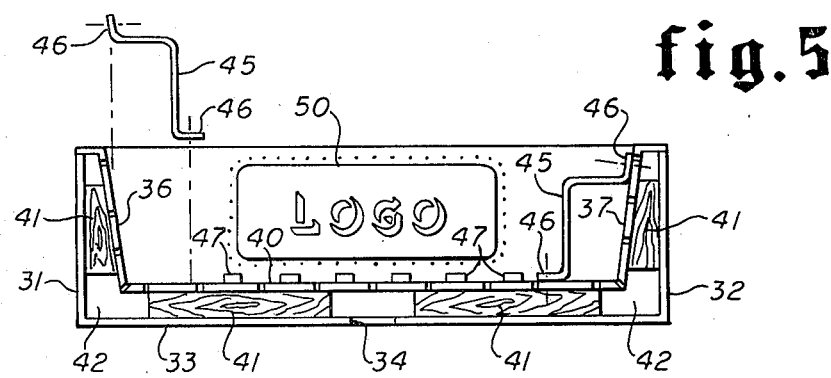
FIG. 5 is a sectional view, partially exploded, taken on the line 5—5 of FIG. 2.
Figure 6:
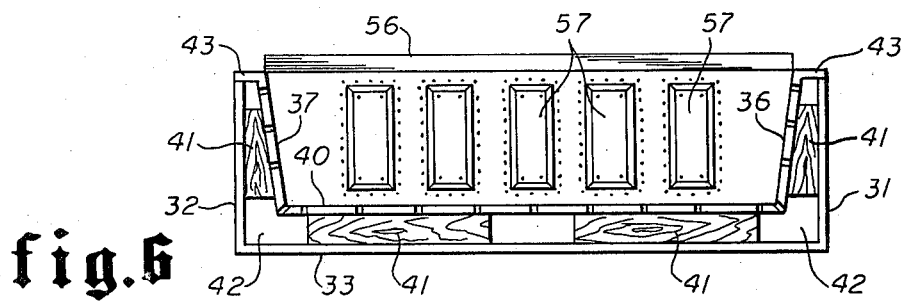
FIG. 6 is a sectional view taken on the line 6—6 of FIG. 2 and showing the tailgate portion of the mold.
Figure 7:
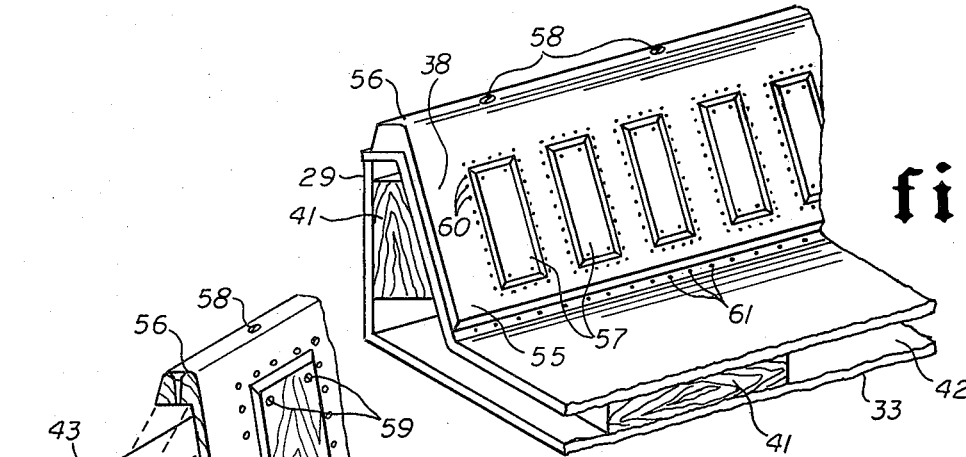
FIG. 7 is an isometric view, taken partially in section along the line 7—7 of FIG. 2.
Figure 8:
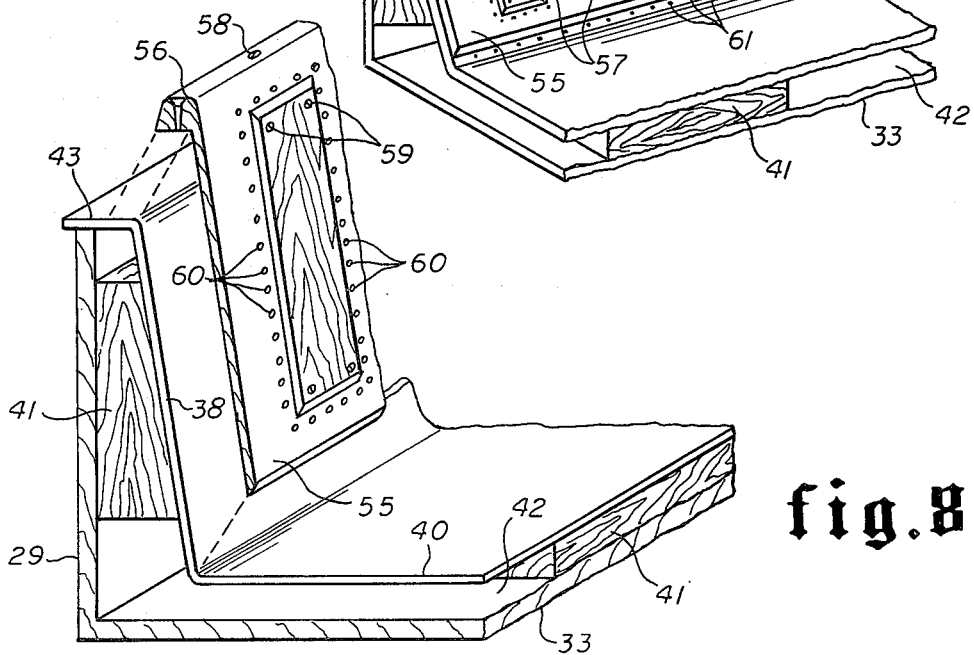
FIG. 8 is an exploded view of the tailgate end portion of the vacuum forming mold showing the replaceable mold member defining the configuration of a particular tailgate liner to be formed.

Referring to the drawings, and more particularly to FIG. 1, there is shown a liner 10 of plastic sheet material for lining the bed of a pick-up truck. Liner 10 is of box shaped construction having a bottom wall 11, side walls 12 and 13, a forward wall 14 and a rear wall 15. In FIG. 1, rear wall 15 is shown cut away in preparation for use as a separate liner member for the tailgate of the truck. The side walls 12 and 13 have flanges 16 and 17 which are integral with a flange 18 on forward wall 14. Side walls 12 and 13 have indented portions 19 and 20 of a size and shape to fit over the wheel wells of the pick-up truck in which the liner is to be installed.

Flanges 16, 17 and 18 provide a means for securing liner 10 to a pick-up truck bed by use of sheet metal screws or the like. Forward wall 14 of truck bed liner 10 has a raised or embossed portion 21 bearing a logo or other indicia or design 22 identifying or decorating the liner. Bottom wall 11 of liner 10 is provided with plurality of short, separated ribs which function to stiffen the bottom and define channels for drainage of water which may collect in the liner.

Rear wall 15 of liner 10 is shown cut away in preparation for use as a tailgate liner. Liner 10, as installed in the bed of pick-up truck is open at the rear as seen in FIG. 1. The piece 15 which has been cut away from the end of liner 10 is a separate piece for use as a tailgate liner. Tailgate liner 10 is shown as having a plurality of reinforcing embossed panels 24 and has the upper edge portion curved as indicated at 25 to fit the upper edge of the tailgate of the truck. The flange portion 26 is trimmed away from the remainder of the tailgate liner prior to installation.

In the past, plastic sheet truck bed liners of this general type (although not of this particular design) have been prepared by vacuum forming into a fixed-size mold having an interior configuration of the general size and shape of a particular make, size and/or style of pick-up truck bed. As a result, each different liner for each different make of pick-up truck has required a separate mold for forming the liner because of the variation in features of design of different pick-up trucks.

American made pick-up trucks are generally quite uniform in width but may vary substantially in length and in the position of the wheel wells and other surface features of the truck bed. Likewise, most foreign-made, imported pick-up trucks, particularly those of Japanese and German manufacture, are of a uniform, but substantially smaller, width than American-made trucks. Foreign-made trucks are of substantially uniform width but also vary in length and in the positioning of the wheel wells and other distinguishing features as is the case of American-made trucks.

The requirement of a separate mold for each separate make and style of pick-up truck for which a liner is desired has added substantially to the cost and to the difficulty of manufacture of such liners. As a result, there has been a need for molds for forming pick-up truck bed liners which can be varied to provide liners for a variety of makes, styles and sizes of pick-up trucks, both American-made and foreign-made.

In FIGS. 2 to 8 of the drawings, there is shown a preferred embodiment of the present invention which is a vacuum forming mold for production of liners for the beds of pick-up trucks of a variety of makes, sizes and styles. In FIG. 2, there is shown a vacuum forming mold 27 which is of a double walled open top box shape. The exterior of mold 27 consists of a rectangular box shaped frame 28 having end walls 29 and 30 and side walls 31 and 32 closed by bottom wall 33. At the center of bottom wall 33 there is provided an opening 34 for connection to a vacuum pump for evacuating the interior of the mold for withdrawing air from the mold cavity below the sheet of plastic to be formed therein. The outer box shaped supporting portion 28 of mold 27 has been of constructed of wood, although fiberglas, or aluminum or any other suitable materials of construction can be used.

The inner portion of mold 27 consists of a one piece rectangular, open top, box-shaped mold 35. Mold portion 35 is preferably formed of a strong, dimensionally stable plastic material such as a molded fiberglass-reinforced plastic sheet material, or a light metal such as aluminum. Mold portion 35 has interior side walls 36 and 37, end walls 38 and 39, and bottom wall 40.

Interior, box shaped mold portion 35 is substantially rectangular in shape but the side walls thereof and end walls may have a very slight taper to permit easy removal of molded parts therefrom. In FIGS. 3, 5, 7 and 8 of the drawing, the taper of the side walls and end walls is exaggerated for easier understanding of the invention. These walls of the mold, however, actually have only a very slight taper to them, e.g. about 1°–2°.

The inner mold portion 35 of vacuum forming mold 27 has the walls thereof spaced from the corresponding walls of the outer, supporting box shaped mold shell 28. This is seen more clearly in FIGS. 3 and 5 of the drawings which show both the spacing of the inner and outer mold parts and also the location of a plurality of spacer members 41 which are positioned to prevent the walls of the mold from collapsing when vacuum is applied through opening 34 in the bottom wall 33 of the supporting box portion 28.

Spacer members 41 are uniformly spaced to support the walls of the inner box shaped mold portion 35 against collapse and have spaces 42 between the ends of adjacent spacer members 41 to permit free circulation of air when vacuum is applied to the mold or when vacuum is released and air allowed to reenter the interior of the double walled space in the mold. The side walls 36 and 37 and end walls 38 and 39 terminate in a continuous peripheral flange 43 which is secured and sealed to the upper edges of the side walls and end wall of the outer box shaped mold part 28, as seen in FIGS. 3 and 5. The peripheral flange 43 is secured in place by heat bonding and may be secured and sealed by any suitable means which provides a continuous air tight seal between peripheral flange 43 and the outer supporting box shaped portion 28. The several walls and bottom of the interior box shaped mold portion 35 are provided with a plurality of very small holes or apertures 44 which are uniformly positioned for withdrawal of air for vacuum forming of sheet plastic material into the mold cavity.

This vacuum forming mold is very versatile and useful for the forming of molded sheet plastic liners for a variety of sizes, styles and makes of pick-up trucks.

Basically, there are two separate and distinct molds which can be used to produce molded liners for virtually all types of pick-up trucks of United States and of foreign manufacture. One size and design of mold has a side to side distance between mold walls 36 and 37 which corresponds to the width of a standard American made pick-up truck bed. The length of the mold cavity from the forward wall 39 to the rear wall 38 is as long as the longest pick-up truck bed normally manufactured in the United States. A similar design is used for liners for truck beds of foreign manufacture with the width of the mold corresponding to the standard width for small or miniature trucks of foreign manufacture, e.g. especially of German and Japanese manufacture. Similarly such a mold has a length corresponding to the longest truck bed of standard foreign manufacture.

The interior of the mold is provided with a plurality of removable and changeable mold parts which correspond to various features of construction of the interior of a pick-up truck bed, such as the size and location of wheel wells, the rib construction on the base or bottom wall of the truck bed, the rib construction of the forward wall of the truck bed, and any special features of construction on the movable rear wall or tailgate of the truck.

The mold is provided with a plurality of mold parts 45 for forming the depression or indentations in the plastic liner which are to fit over the wheel wells of the particular pick-up in which the liner is to be used. Since the wheel wells in various makes and models of pick-up trucks vary considerably in size and in location, the mold is provided with a number of different mold inserts 45 which are of a size and shape corresponding to the particular wheel wells for any particular make or style or size of truck bed liner being manufactured.

In FIG. 2, wheel well mold insert 45 is shown in an exploded position relative to the mold cavity. Wheel well mold insert 45 has a peripheral flange 46 by which it is attached to the walls of the mold cavity by suitable fasteners 47a, such as screws or the like, as seen schematically in FIG. 5. The outline of the flange 46 and the heads of screws 47a are reproduced in the plastic which is molded in this mold (see FIG. 1 showing outline of flange and screw heads 48a). Each of the wheel well mold inserts 45 is provided with a plurality of small holes or apertures 47 which are drilled therein at the time of installation and are drilled through the walls of the mold cavity to provide openings adjacent the edges of the mold insert to assist in drawing the plastic sheet being formed into intimate relation with the mold insert. A similar arrangement is provided throughout the mold where a plurality of small holes are provided around each of the various removable and adjustable mold parts which define surface configurations in the molded truck bed liner.

On the bottom wall 40 of the mold cavity, there are provided a plurality of rib inserts 47 which are secured in place by screws or the like 48, as seen in FIG. 4. Bottom wall 40 has a plurality of very small holes or apertures 49 uniformly spaced around the base of each of the rib insert members 47. The holes or apertures 49 extend into the space between the hollow walls of the mold in the same manner as the uniformly spaced apertures 44 shown in FIG. 3. The holes or apertures 49 which are closely spaced to the base of each of the rib inserts 47 are effective to assist in providing vacuum to draw the plastic sheet material into intimate contact with the rib inserts and thus define a desired rib configuration in the bottom wall of the plastic liner 10. The rib inserts 47 are effective to produce the short ribs 23 in the bottom of plastic liner 10 as seen in FIG. 1.

At the forward end of the mold cavity, there is provided a removable mold insert plate member 50 which is secured on end wall 39 by a plurality of fasteners such as screws 51 or the like which have enlarged heads 51a. Mold insert 50 is a panel shape member which has raised letters or other indicia 52 thereon which may be decorative or may be the identifying trademark or logo of the manufacturer or distributor or other interested party. A plurality of panels 50 are provided which may be removed and replaced to change the particular design or logo on the end wall 14 of the truck bed liner 10.

The letters or logo 52 on removable mold insert 50 correspond to the letters or logo 22 produced in the raised or embossed portion 21 of end wall 14 of liner 10. The round embossed portions 21a on the end wall of liner 10 correspond to the heads 51a of screws 51 holding mold insert or panel 50 in place. A plurality of holes or apertures 53 are provided in the forward end wall 39 of the mold cavity in close proximity to the edge of removable mold insert 50. This is effective to assist in drawing the molded plastic into intimate contact with the mold insert. Likewise, a plurality of holes or apertures 54 surround the edges of each of the letter or indicia or other identifying features 52 of the mold insert panel 50 to provide for withdrawal of air when vacuum is applied and thus draw the plastic into intimate contact with those features of the mold insert.

The rear wall portion of the mold cavity corresponds to the tailgate of the truck bed for which the liner is being formed. The rear wall 38 is provided with a removable panel member 55 which is shown in more detail in FIGS. 6, 7 and 8. Panel 55 has an upper end forming a rib portion 56 having a configuration corresponding to the upper surface of the tailgate of the truck for which the liner is being produced. Panel 55 is also provided with a plurality of raised panel portions 57. Rib portion 56 can be secured to the upper edge of the rear wall of the mold cavity by screws 58. Screws 59 secure panel 55 to the end wall 38 of the mold cavity.

A plurality of holes or apertures 60 extend through panel member 55 and through end wall 38 of the mold cavity into the hollow space between the inner mold member 35 and the outer supporting member 28. Holes 60 surround the individual raised panel members 57 to provide for withdrawal of air to pull the plastic being formed into intimate contact with the surface of the raised panel portions to produce that configuration in the tailgate liner portion of the molded object. The raised panel portion 24 and the tailgate liner 15 are produced by these panel mold inserts 57. A plurality of small holes or apertures 61 are provided at the base of end wall 38 along the lower edge of removable panel member 55 to assure withdrawal of air at that portion so that the plastic will be pulled into intimate contact with the bottom of the mold cavity.

OPERATION

The operation of this vacuum forming mold should be apparent from the description of its construction and assembly. Nevertheless, the operation will be described in more detail to provide a more thorough understanding of the invention.

In FIG. 3, vacuum forming mold 27 is shown positioned with a sheet 62 of thermoplastic material for forming into a truck bed liner as shown in FIG. 1. The sheet plastic may be of any suitable composition and thickness but is selected to provide a tough and durable liner. A typical liner will be about ⅛" thick after forming, although thinner or thicker materials may be used as dictated by economic considerations. The sheet plastic is preferably an easily molded material such as an ABS plastic which may be coextruded with a coating of a more durable plastic finish.

In FIG. 3, the sheet 62 of plastic is shown positioned over the top of the mold and held in place by upper clamping device 63, only portions of which are shown. The end portion (not shown) of clamping device 63 which fits over rib 56 on the tailgate end of the mold cavity is configured to fit that rib with allowance for the thickness of the plastic to cause the plastic to bend around rib 56. When sheet 62 of plastic is clamped by the clamping device 63 in position it is heated by suitable heating means, such as electric radiant heaters or the like. Sheet 62 of plastic is heated to a softening temperature and the hole or aperture 34 in the bottom of the mold is connected to a vacuum pump for the withdrawal of air from the cavity between the inner and outer walls of the mold.

A vacuum is thus drawn in the space between the inner mold portion 35 and the outer supporting box portion 28 which withdraws air from the space beneath sheet 62 of plastic through the various holes or apertures 44, 47, 49, 60, 61, etc. This withdrawal of air sucks the plastic sheet 62 into the mold cavity to the position shown in dotted line where the sheet has reached the configuration of the mold cavity and the various mold inserts which define the surface features and other structural features of the plastic liner being formed.

The various holes which are uniformly spaced in the walls of the mold cavity provide for a uniform withdrawal of the air so that the plastic will be drawn quickly into position against the various removable and adjustable mold parts. As the plastic contacts these various mold parts, it is further drawn into intimate contact with those parts by means of the small holes located around the base of the parts which permit air to be withdrawn and the plastic thus caused to form itself into the shape of the various mold parts.

The plastic sheet 62 is therefore drawn into the mold cavity and forms itself around the wheel well inserts 45 to produce the wheel well indentations 19 and 20 in the finished liner 10 as seen in FIG. 1. Plastic sheet 62 is drawn into intimate contact with the rib members 47 and with the bottom wall 40 of the mold cavity to form the ribs 23 in the bottom wall 11 of liner 10 as seen in FIG. 1. The portion of plastic sheet 62 which is drawn against the end wall 39 of the mold cavity is drawn into intimate contact with the removable panel member 50 to define the embossed portion 21 and logo or other indicia or decoration 22 in the finished liner. The plastic sheet 62 is drawn into intimate contact with the rear panel 55 and defines accurately the shape of the tailgate portion 15 of truck bed liner 10.

After the truck bed liner 10 has been formed in mold 27, as just described, it is removed from the mold for final trimming and finishing. Excess material around flange 16, 17 and 18 is trimmed to produce a flange of the desired width for the particular truck in which the liner is to be installed. The liner is initially made to the length of the maximum length truck bed for which liners are required. The wheel wells 19 and 20, however, are positioned for the particular make, size and style of truck.

The liner 10 is then cut to the desired length corresponding to the particular truck bed length so that when it is placed in position, the wheel well indentations 19 and 20 will fit over the wheel wells and the rear end of the liner will terminate at the rear end of the truck bed. The extreme rear portion of the molded liner is trimmed, after being cut away from the main liner as formed, to remove excess material and leave a single piece liner 15 for the tailgate of the truck. The truck bed liner 10 and the tailgate liner 15 are secured in position by a plurality of sheet metal screws of the like.

As described above, a single mold of this type can be used to produce virtually all of the different liners required for an American made pick-up truck. Likewise, a single smaller mold can be used for production of liners for any of the small foreign trucks, especially the German and Japanese made trucks. The various mold inserts 45 for the wheel wells are of a size corresponding to the wheel well sizes for the particular truck for which the liner is being prepared. These mold inserts can be positioned at the specified location longitudinally of the mold cavity. The end panel 50 can be removed and replaced to produce any suitable design or logo in the end wall of the liner being formed.

The mold inserts or ribs 47 in the bottom of the mold cavity are spaced to provide interrupted ribs in the bottom of the finished liner. This arrangement of interrupted ribs allows the bottom of the liner to fit on the bottom wall of any of the various designs or makes of trucks without regard to the configuration of ribs in the actual bed of the truck. The interchangeable rear panel portion 55 makes possible the formation of a liner for the tailgate of any particular make, style or size of truck for which the liners are being manufactured. When the various mold inserts are moved to different locations or when mold inserts of different sizes or shapes are used, the holes in the mold walls where the previous inserts were secured are plugged and new holes are drilled to secure the inserts in the new positions.

While this inventions has been described fully and completely with special emphasis upon a single preferred embodiment, it should be understood that within the scope of the appended claims the invention may be practiced otherwise than as specifically described herein.

I claim:
1. A vacuum forming mold for forming sheet plastic into bed liners for the beds of pick-up trucks, comprising
    an open top rectangular box-shaped mold having a hollow wall construction with an outer supporting wall and an inner wall spaced therefrom with space therebetween adapted to be subjected to vacuum for vacuum forming sheet plastic,
    said inner mold wall having a bottom wall, side walls and end walls,
    said side walls having a side to side width to accomodate the standard width of the bed of a pick-up truck of United States or foreign manufacture,
    said mold having a length between the end wall thereof at least equal to the maximum length of the bed of a pick-up truck of United States or foreign manufacture, respectively,
    a plurality of removable mold parts adapted to be secured on said inner mold wall and having a size and shape corresponding to features of a selected make of pick-up truck, said inner mold wall having a plurality of small holes therein uniformly spaced on said bottom wall and spaced around the edges of said removable mold parts, whereby the application of a vacuum to the space between said outer and inner walls is effective to draw a sheet of heated plastic into intimate contact with said inner wall and the surface of said removable mold parts, and said outer wall having an opening for application of a vacuum thereto.

2. A vacuum forming mold according to claim 1 in which said hollow wall construction includes a plurality of ribs positioned between said inner and outer mold walls, spaced laterally to provide uniform support against collapsing said walls upon application of vacuum, and interrupted at selected points to provide an open path for uniform application of vacuum.

3. A vacuum forming mold according to claim 1 in which said removable mold parts comprise a pair of parts having a size and shape corresponding to the wheel wells of a selected make of pick-up truck and having base portions removably positioned on the inside side and bottom walls of said mold at a position longitudinally thereof corresponding to the position of the wheel wells in said selected make truck bed, and said inner mold wall having at least part of said plurality of holes positioned in the bottom and side walls thereof surrounding said wheel well mold parts at the base portions thereof.

4. A vacuum forming mold according to claim 1 in which said mold parts comprise a plurality of strips removably positioned on the bottom wall of said mold and operable to define ribs of selected size and shape in the bottom wall of said plastic liner to be formed therein.

5. A vacuum forming mold according to claim 1 in which said mold parts comprise a plurality of short strips removably positioned on the bottom wall of said mold and spaced apart in end to end relation and in substantially parallel side to side relation and operable to define a plurality of interrupted ribs in the bottom wall of said plastic liner to be formed therein.

6. A vacuum forming mold according to claim 1 in which said mold parts comprise a removable member fitting the end wall of said mold corresponding to the forward wall of said plastic truck bed liner to be formed therein and having a selected size and shape including identifying indicia operable to form corresponding indicia in said liner.

7. A vacuum forming mold according to claim 1 in which said mold parts comprise a removable member fitting the end wall of said mold corresponding to the tail gate of the truck bed for which said liner is being formed and having a top edge and a surface configuration corresponding to the size and shape of said tail gate.

8. A vacuum forming mold according to claim 1 in which said removable mold parts comprise a pair of parts having a size and shape corresponding to the wheel wells of a selected make of pick-up truck and having base portions removably positioned on the inside side and bottom walls of said mold at a position longitudinally thereof corresponding to the position of the wheel wells in said selected make truck bed, said mold parts further comprise a plurality of strips removably positioned on the bottom wall of said mold and operable to define ribs of selected size and shape in the bottom wall of said plastic liner to be formed therein, and said inner mold wall having some of said plurality of holes positioned in the bottom and side walls thereof surrounding said wheel well mold parts at the base portions thereof and some of said holes surrounding each of said removable strips.

9. A vacuum forming mold according to claim 1 in which said removable mold parts comprise a pair of parts having a size and shape corresponding to the wheel wells of a selected make of pick-up truck and having base portions removably positioned on the inside side and bottom walls of said mold at a position longitudinally thereof corresponding to the position of the wheel wells in said selected make truck bed, said mold parts further comprise a plurality of short strips removably positioned on the bottom wall of said mold and spaced apart in end to end relation and in substantially parallel side to side relation and operable to define a plurality of interrupted ribs in the bottom wall of said plastic liner to be formed therein, and said inner mold wall having some of said plurality of holes positioned in the bottom and side walls thereof surrounding said wheel well mold parts at the base portions thereof and some of said holes surrounding each of said removable short strips along the sides and end thereof.

10. A vacuum forming mold according to claim 1 in which said removable mold parts comprise a pair of parts having a size and shape corresponding to the wheel wells of a selected make of pick-up truck and having base portions removably positioned on the inside side and bottom walls of said mold at a position longitudinally thereof corresponding to the position of the wheel wells in said selected make truck bed, said mold parts further comprise a plurality of short strips removably positioned on the bottom wall of said mold and spaced apart in end to end relation and in substantially parallel side to side relation and operable to define a plurality of interrupted ribs in the bottom wall of said plastic liner to be formed therein, said mold parts further comprise a removable member fitting the end wall of said mold corresponding to the forward wall of said plastic truck bed liner to be formed therein and having a selected size and shape including identifying indicia operable to form corresponding indicia in said liner, and said inner mold wall having some of said plurality of holes positioned in the bottom and side walls thereof surrounding said wheel well mold parts at the base portions thereof, some of said holes surrounding each of said removable short strips along the sides and ends thereof, and some of said holes in said end wall surrounding said removable member and further surrounding said indicia-forming features thereon.

11. The vacuum forming mold of claim 1 in which said removable mold parts comprise parts of a size and shape corresponding to the wheel wells of a selected make of pick-up truck with base portions removably positioned on the inside side and bottom walls of said mold at a position corresponding to the position of the wheel wells in said selected make truck bed, said mold parts further comprise a plurality of short strips removably positioned on the bottom wall of said mold and spaced apart in end to end relation and in substantially parallel side to side relation and operable to define a plurality of interrupted ribs in the bottom wall of said plastic liner to be formed therein, said mold parts further comprise a removable member fitting the end wall of said mold corresponding to the forward wall of said liner to be formed therein of a selected size and shape including identifying indicia operable to form corresponding indicia in said liner, said mold parts further comprise a removable member fitting the end wall of said mold corresponding to the tail gate of the truck bed for which said liner is being formed and having a top edge and a surface configuration corresponding to the size and shape of said tail gate, and said inner mold wall having some of said plurality of holes positioned in the bottom and side walls thereof surrounding said wheel well mold parts at the base portions thereof, some of said holes surrounding each of said removable short strips along the sides and ends thereof, some of said holes in said end wall surrounding said removable member and further surrounding said indicia-forming features thereon, and some of said holes positioned in the surface of said tail gate liner forming member.

12. A vacuum forming mold according to claim 7 in which said last named removable member is of unitary construction.

13. A vacuum forming mold according to claim 7 in which said last named member has an upper edge portion removable and replacable to provide a configuration corresponding to the upper edge of a tail gate for said selected make pick-up truck.

* * * * *